Nov. 1, 1966 W. H. CHERRY 3,283,217
ELECTROMAGNETICS
Filed March 21, 1963 4 Sheets-Sheet 1
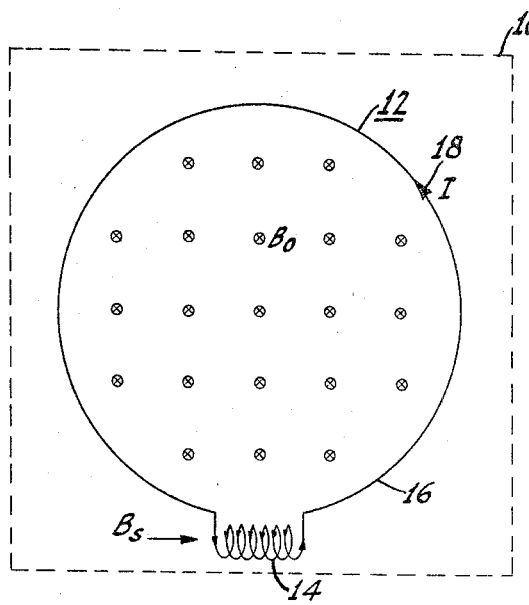
Fig. 1.
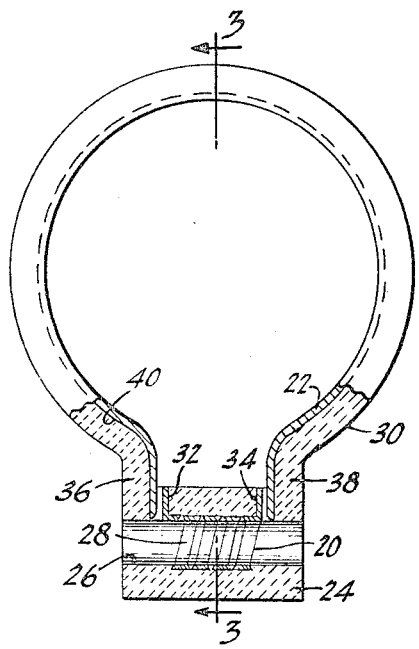
Fig. 2.
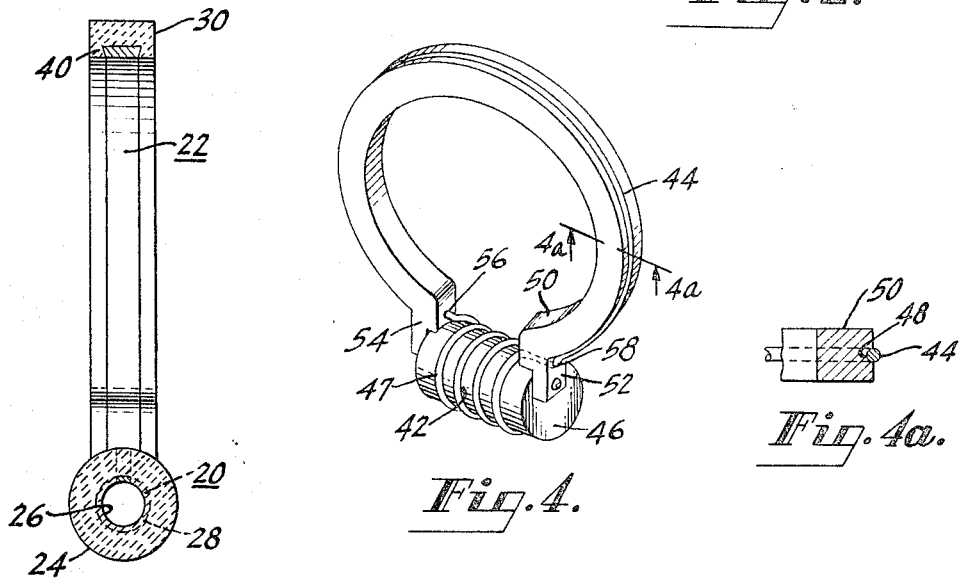
Fig. 3.
Fig. 4.
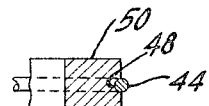
Fig. 4a.
INVENTOR.
WILLIAM H. CHERRY
BY
ATTORNEY Nov. 1, 1966 W. H. CHERRY 3,283,217
ELECTROMAGNETICS
Filed March 21, 1963 4 Sheets-Sheet 2

INVENTOR.
WILLIAM H. CHERRY
BY
ATTORNEY

Nov. 1, 1966     W. H. CHERRY     3,283,217
ELECTROMAGNETICS
Filed March 21, 1963     4 Sheets-Sheet 3
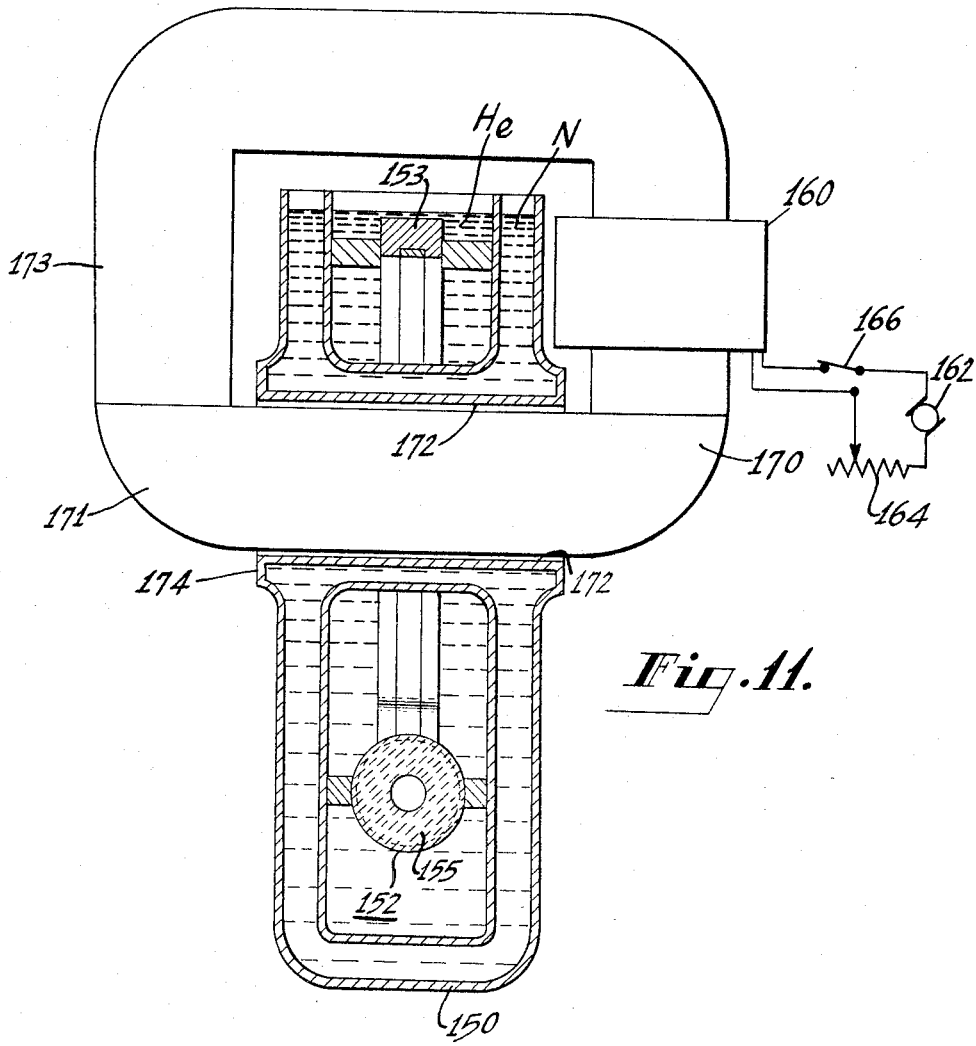
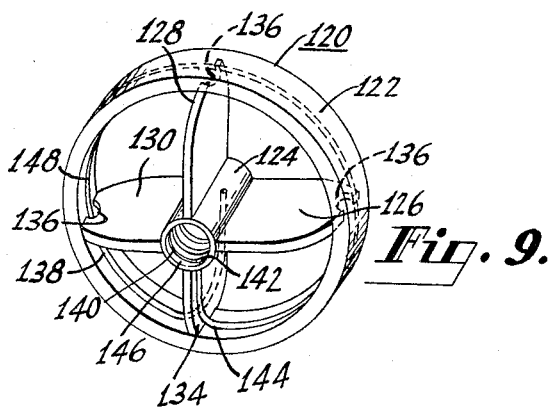
INVENTOR.
WILLIAM H. CHERRY
BY
ATTORNEY

INVENTOR.
WILLIAM H. CHERRY

United States Patent Office 3,283,217
Patented Nov. 1, 1966

3,283,217
ELECTROMAGNETICS
William Henry Cherry, Princeton, N.J., assignor to Radio Corporation of America, a corporation of Delaware
Filed Mar. 21, 1963, Ser. No. 267,056
8 Claims. (Cl. 317—123)

This invention relates to methods of and apparatus for producing concentrated magnetic fields, and particularly to methods of and apparatus for utilizing superconductors to generate self-sustaining, high flux density magnetic fields.

The invention is especially suitable for providing superconducting solenoids which can generate highly concentrated magnetic fields in the order of 50 kilogauss to 250 kilogauss or higher. Such magnetic fields are desirable for concentrating plasmas, as in magnetohydrodynamic devices and in nuclear and atomic research. The invention is also generally useful in any application for high density magnetic fields.

Superconductive materials are now available which can support high density magnetic fields and high current densities at low temperatures (around 18° K.) without becoming normal (nonsuperconducting). Such materials are known as hard superconductive materials. Niobium zirconium (NbZr) and niobium tin ($Nb_4Sn$ or $Nb_3Sn$) are examples of such hard superconductive materials. Niobium is also known as columbium.

Very large currents may be carried by these hard superconductive materials without their becoming normal. For example, superconducting $Nb_3Sn$ is capable of carrying a current density of the order of a hundred thousand amperes per square centimeter. When these large currents flow through a coil of superconducting material, a high density magnetic field is produced in the vicinity of the coil. It has been difficult to set up large currents in such coils. For example, currents are often introduced into the superconducting coil through contacts with non-superconducting material (material which is nonsuperconducting in the range of temperatures where the material used for the coil is superconducting). The non-superconducting material provides a thermal path through which heat can be introduced into the superconducting material and the current through these nonsuperconducting contacts generates heat which also can pass into the superconductor. The presence of such heat tends to return the superconductive material to its nonsuperconducting or normal state.

Accordingly, it is an object of the present invention to provide improved methods of and apparatus for utilizing superconductors to provide high density magnetic fields, by means of which the foregoing difficulties and disadvantages may be overcome.

It is another object of the present invention to provide an improved method of and apparatus for utilizing coils of superconductive material to provide a higher density magnetic field than has heretofore been obtainable.

It is a further object of the present invention to provide improved methods of and apparatus for establishing high magnitude persistent currents in superconductors.

It is a still further object of the present invention to provide an improved superconductor solenoid structure which will withstand higher mechanical forces developed by high intensity magnetic fields than prior solenoid structures.

In accordance with the present invention, a large persistent current is established in an endless superconducting path by induction. A magnetic field is produced in response to this persistent current which is more concentrated than the magnetic field which establishes the persistent current. For example, the superconducting path may include a path portion which defines a solenoidal coil and another path portion which connects the ends of the coil and defines therewith an endless superconducting path. The latter path portion may be in the form of a loop. A variable magnetic field external to the loop excites a persistent current in it. This current flows through the solenoidal coil and establishes a magnetic field in the vicinity of the coil more concentrated than the exciting magnetic field.

The invention itself, both as to its organization and method of operation, as well as additional objects and advantages thereof, will become more readily apparent from the following description when read in connection with the accompanying drawings, in which:

FIG. 1 is a schematic diagram of solenoid apparatus embodying the invention;

FIG. 2 is a sectional view of a solenoid apparatus embodying the invention;

FIG. 3 is a sectional view taken along the line 3—3 in FIG. 2, as viewed in the direction of the appended arrows;

FIG. 4 is a perspective view of a second solenoid apparatus embodying the invention;

FIG. 4a is a fragmentary sectional view taken along the line 4a—4a in FIG. 4, as viewed in the direction of the appended arrows;

FIG. 9 is a perspective view of a fifth embodiment of the present invention;

FIG. 11 is a diagram similar to FIG. 10 of other apparatus embodying the invention for setting up a persistent current.

Figure 5:
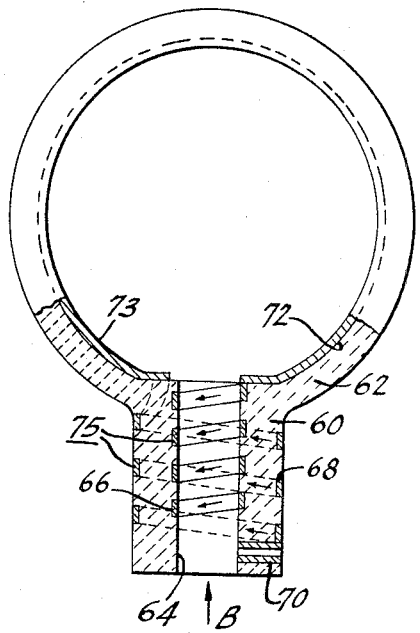
FIG. 5 is a front elevational view, partly in section, of a third embodiment of the present invention.

Referring more particularly to the drawings, the dash lines 10 in FIG. 1 designate a cryostat including liquid helium and maintained at superconducting temperatures. Solenoid apparatus 12 is located within the cryostat. This apparatus 12 includes a plural turn solenoidal coil 14. A loop 16 is connected between the ends of the coil 14. The diameter of the loop is much larger than the diameter of the turns of the coil. For example, the loop may be ten times larger in diameter than the coil. The loop may have a plurality of turns but fewer than the number of turns in the coil 14. The coil 14 and loop 16 define a closed circuit. Superconductor material, such as niobium tin, may be used for the coil and the loop. Accordingly, an endless superconducting path is provided including the turns of the coil 14 and the loop 16.

A magnetic field which threads or passes through and links the loop 16 is provided. This field is designated by the legend $B_0$ and is illustrated by a pattern of circles inscribed with crosses. These crosses indicate that the field is directed into the paper. The field does not substantially link the coil 14, since the axis of the coil is perpendicular to the axis of the loop 16 and to direction of the magnetic field. The coil 14 may, however, have its axis in the direction of the field, as will be explained hereinafter, in which case the field will link the coil 14. The winding sense of the coil 14 and loop 16 are desirably the same when their axes are parallel. Then the currents induced in the loop and coil and the flux established in response to such induced currents are aiding. When the axes of the coil and loop are perpendicular to each other, another external magnetic field directed along the coil axis may be applied and aided by the field generated by the coil without interference with the field threading the loop.

The flux density of the field is varied so that the field may have an initial flux density at a certain time $T_0$ and a different flux density at a later time $T_1$. The superconductive material of the coil 14 and loop 16 becomes superconducting at the time $T_0$ and remains superconducting up to and beyond the time $T_1$. Since the amount of flux linking the loop 16 changes between the time $T_0$ and $T_1$, a current I is induced into the loop. Since the loop is rendered superconducting, this current remains circulating in the loop. The continuously circulating current is known as a "persistent current." The field may be referred to as an "exciting field" since it sets up the persistent current in the loop.

The induced persistent current I is a maximum for a given amplitude of exciting field when the flux linking the loop 16 reverses in direction and is initially and finally of the same magnitude. However, significant current will be induced when the final flux linking the loop is zero. It may be desirable to change the flux from a certain initial density at time $T_0$ to zero at time $T_1$, since the amount of expended magnetic field power for inducing the current is less than the power expended if the field were reversed and sustained. The superconductor material of the coil 14 and the loop 16 may be changed in various ways from a normal to a superconducting state after the field which sets up the induced current attains its initial flux density at time $T_0$. For example, liquid helium may be introduced into the cryostat while or after the initial flux density of the exciting field is established, so that the superconductor is superconducting when the field attains its initial flux density. Alternatively, the superconductive material of the coil 14 and loop 16 may be initially in the superconducting state. The external field may then first have a flux density greater than the critical flux density of the superconductive material, so that the material is or becomes normal. As the flux density of the exciting field is reduced, the superconductive material becomes superconducting and then the current induced in the loop persists.

The persistent current flows around the endless superconducting path through the loop 16 in the direction indicated by the arrow 18 and around the turns of the coil 14. This persistent current generates magnetic fields within the loop 16 and the coil 14. The totality of the generated magnetic field is governed by the law of conservation of flux which dictates that the total flux established at and after time $T_1$ by the current I in the superconducting path is equal to the exciting flux which was effective when the superconductor became superconducting (i.e., at the time $T_0$). This assumes that, at and after time $T_1$, the external excitation ceases. However, the distribution of the flux which is established by the persistent current is not dictated by the so-called law of conservation of flux. The geometry of the superconducting path establishes the distribution of the flux. In particular, the flux generated by the induced current flowing through the plural turn coil 14 is more concentrated than the flux generated by the loop 16, since the flux density of the field generated by a coil is a function of the number of turns in that coil and the size of the coil. The density of the field generated by the coil 14 may, therefore, be much greater than that generated by the loop. Thus, the flux density in the loop may be much less than the density of the exciting field, and the density in the coil much greater than the density of the exciting field, while the total of the flux in the loop and in the coil is equal to the flux generated initially by the exciting field in the loop alone. Thus, the final result is a flux density in the coil much greater than that of the exciting field.

It may be considered that a persistent current is induced in a first portion of the endless superconducting path, namely the loop 16, and that that persistent current generates a first field. A second field is then generated in response to the persistent current in a second portion of the endless superconducting path, namely the coil 14, which is more concentrated than the first field because of the plurality of turns in the coil 14.

A monolithic structure for supporting a coil 20 and a loop 22, similar to the coil 14 and loop 16, is shown in FIGS. 2 and 3. A cylinder 24 of material which may not be superconducting in the entire range of temperatures in which the coil 20 and loop 22 are superconducting is provided. This cylinder may be made of ceramic material, such as alumina. Alumina is especially desirable since its coefficient of thermal expansion is approximately the same as the coefficient of thermal expansion of niobium tin. However, other nonsuperconductive materials, such as steel, platinum or stainless steel, may also be used, especially when greater tensile strength or higher magnetic permeability than can be provided by alumina is desired. The stainless steel does not short circuit the coil or loop since its resistance is much higher, especially at temperatures where the coil and loop are superconducting. The cylinder 24 has an axial hole 26. A helical groove 28 is formed in the inner periphery of the cylinder which defines the hole 26. The hole 26 and the groove 28 may be formed by molding, in the case of alumina, or by boring, in the case of stainless steel or other metal. The groove 28 may have as many turns as necessary or desirable.

A substantially ring-shaped supporting member 30 of the same material as the cylinder is formed integrally with it, the ring member 30 and the cylinder 24 forming a monolithic support structure. Two holes 32 and 34 are formed in the cylinder adjacent foot portions 36, 38 of the ring 30 which join the ends of the ring 30 to the cylinder 24. A groove 40 is formed around the inner periphery of the ring 30. This groove extends along the foot portions 36 and 38, and communicates with the holes 32 and 34. The first and last turns of the helical groove 28 also respectively communicate with the holes 32 and 34. The grooves 28 and 40 may be tapered transversely as in the mortise of a dovetail.

Superconductive material, such as niobium tin, may be deposited on all surfaces of the structure, including the cylinder 24, the ring 30 and the foot portions 36, 38 and in the various holes and grooves of the structure. A process for such deposition of niobium tin was described in a paper by J. J. Hanak, given at the Conference on Advanced Electronic Materials, which was held under the auspices of the American Institute of Metallurgical Engineers in Philadelphia, Pennsylvania, in August of 1962. (See "Electronic News," July 30, 1962.) Briefly, this process involves passing mixed vapors of tin chloride and niobium chloride over the surfaces of the structure and admitting sufficient reducing gas into the mixed vapors, so that the chlorides are reduced and the metal portions of the vapors are deposited on the surfaces of the structure. The surfaces are then covered with an adherent coating consisting essentially of crystalline niobium tin. The coating may, by chipping, abrasion, dissolution or otherwise, be removed from the surfaces of the structure except for the helical grooves 28, the holes 32 and 34 and the grooves in the ring member 30 and foot portions 36 and 38. The coil of superconductive material 20 is provided by the niobium tin in the grooves 28 and the loop 20 of superconductive material is provided by the niobium tin in the groove 40. The loop 22 and coil 20 are interconnected by the niobium tin deposited on the foot portions 36 and 38, and in the holes 32 and 34.

A persistent current may be induced, as explained above, in the loop 22. This current will flow around the superconducting path defined by the material left in the grooves and holes. Therefore, the current also flows through the coil 20, which then provides a persistent magnetic field in its vicinity. Mechanical forces due to the field generated by the coil 20 tend to expand and stretch the coil. These forces are effectively constrained by the cylinder 24 which surrounds the coil. Forces tending to expand the loop 22 are also constrained by the ring 30. Thus, the monolithic structure of the solenoid apparatus shown in FIGS. 2 and 3 is physically strong and capable of handling large forces resulting from the concentrated magnetic fields produced by the persistent currents.

In FIG. 4, there is shown another solenoid apparatus including a solenoidal coil 42 and a loop 44 which is connected to the ends of the coil to provide a closed circuit. The coil 42 is wound around a cylinder 46, made, for example, of stainless steel which is nonsuperconductive. A helical groove 47 around the outer periphery of the cylinder, and in which the coil 42 is seated, prevents the coil 42 from shifting in response to magnetic fields which may be generated by the coil. The loop 44 is seated in a circumferential groove 48 formed in the periphery of a substantially ring-shaped support 50 of the same material as the cylinder 46. The foot portions 52 and 54 on the ends of the ring-shaped support 50 are attached to the ends of the cylinder 46 by means of screws. Holes 56 and 58 drilled through these foot portions provide access for connections between the loop 44 and the coil 42, both of superconductive material at the operating temperatures. The groove 48 prevents shifting of the loop 44.

The loop 44 and the coil 42 may be made from a flexible wire of superconductive material or of a filament covered, for example, with a nonporous, high density coating of crystalline niobium tin. This coating may be deposited on a wire (for example, a tungsten wire) by continuously passing the wire through a mixture of hydrogen and the mixed vapors of niobium chloride and tin chloride. A portion of the wire is heated to a temperature sufficient to induce the reduction of some of the chlorides so that the metal portions of the reduced chlorides are deposited on the wire. The process of making a niobium tin coated filament or wire is also discussed in the above-referenced article.

The ends of the coil 42 may be passed through the holes 56 and 58 and joined to the ends of the loop 44 of wire, as by welding, so as to provide superconductive contacts. The apparatus illustrated in FIG. 4 may be located in a cryostat, and persistent currents may be induced therein to provide a concentrated magnetic field generated by the current in the coil 42.

Solenoid apparatus illustrated in FIG. 5 includes a monolithic support structure consisting of a cylinder 60 and a ring-shaped member 62 of ceramic material, such as alumina. Other nonsuperconductive material, such as stainless steel, may be used for the structure. The member 62 has a gap in which the cylinder 60 is disposed. The axis of the cylinder 60 is in the plane of the ring member with the axis of the cylinder perpendicular to, and when extended, intersecting that of the ring member 62. The cylinder 60 has a coaxial cylindrical bore or hole 64 through it. A helical groove 66 is formed in the inner surface of the cylinder which defines the hole 64. This groove may be tapered transversely as in the case of a mortise of a dovetail, if desired. Another helical groove 68 is formed on the outer surface of the cylinder. The pitch of the inner and outer grooves 66 and 68 may be the same. However, the inner groove and the outer groove may be inclined in opposite directions. A hole 70 provides communication between the bottom turns, as viewed in the drawing, of the inner and outer grooves. A relatively small number of grooves is shown in the drawing to simplify the illustration, but it will be understood that as many grooves as desired may be used.

Figure 6:
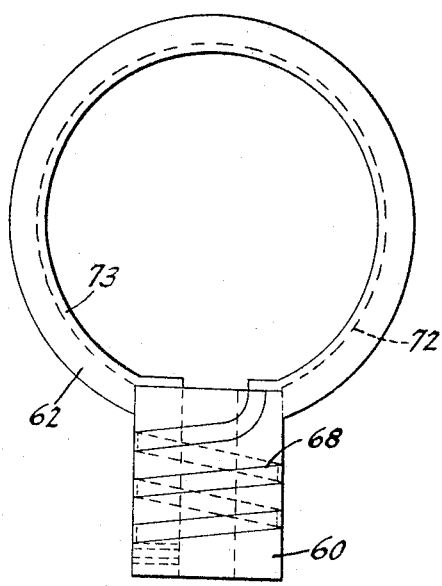
FIG. 6 is a rear elevational view of the apparatus shown in FIG. 5.

The ring 62 is formed with a circumferential groove 72 along its inner periphery, which also may have a tapered formation as in a mortise, along its inner surface. This groove may be extended along the upper end surface of the cylinder 60. One end of the groove 72 communicates with the upper or first turn of the inner helical groove 66. The other end of the groove 72 communicates with the upper or first turn of the outer groove 68. The first turn of the outer groove 68 may deviate somewhat from its helical path to communicate with the end of the groove 72 (see FIG. 6).

A superconductive material, such as niobium tin, may be deposited in the grooves 66, 68 and 72, and along the holes of the wall 70 by the process of depositing a coating on all surfaces of the structure and removing the coating except from along the walls of the hole 70 and from the grooves. The process described above and discussed in the above-referenced article may be used to deposit the niobium tin. An endless path of superconductive material (niobium tin) is formed by the deposited coating. The path portions around the inner surface of the ring 62 define a superconductive loop 73, and the path portions along the peripheries of the cylinder 64 define a solenoidal coil 75. The complete path extends from the coating in the hole 70, along the coil 75 on the outer periphery of the cylinder, around the loop 73, along the coil 75 on the inner periphery of the ring 62, and back to the coating in the hole 70.

The apparatus may be located in a cryostat and a persistent current induced in the loop 73. This persistent current then flows through the layer of the coil 75 on the inner surface of the cylinder 64 and through the layer of the coil 75 on the outer periphery of the cylinder 64. Since the grooves 66 and 68 and the superconductive coil layers located therein are inclined in opposite directions and are interconnected at their ends, the current flow direction is as indicated by the arrows shown in FIG. 5, and the magnetic field generated in response to this current by the inner coil layer adds to the magnetic field generated by the outer, peripheral coil layer. An intense, concentrated magnetic field of high flux density is generated by the persistent current which flows through the coil 75. Since the superconductive material is embedded in the grooves of the monolithic support structure, forces tending to displace these coils, which may be produced by the generated magnetic fields, are effectively constrained.

Figure 7:
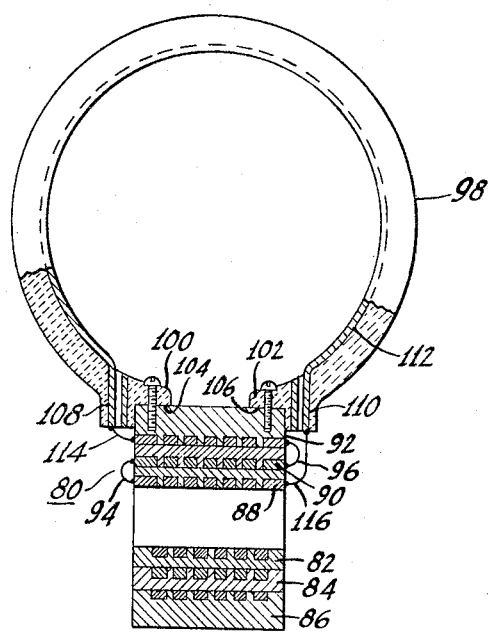
FIG. 7 is a front elevational view, partly in section, of a fourth embodiment of the present invention.
Figure 8:
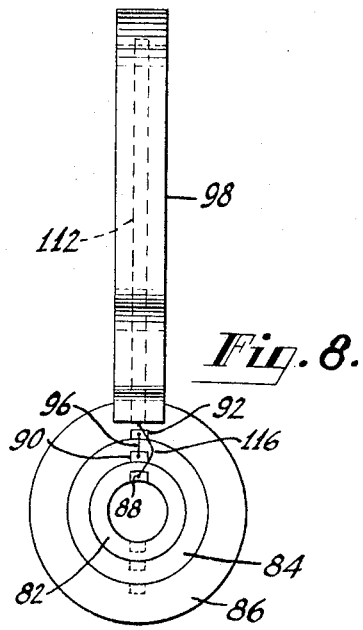
FIG. 8 is an elevational end view of the apparatus shown in FIG. 7.

Referring to FIGS. 7 and 8, there is shown a solenoid apparatus including a multilayer solenoidal coil 80. Three tubes or hollow cylinders 82, 84 and 86 of progressively larger diameter are arranged in nested, coaxial relationship. Each of these cylinders 82, 84 and 86 may be made of nonsuperconductive material, such as stainless steel or ceramic. Helical grooves are formed along the inner peripheral surfaces of these cylinders 82, 84 and 86. The groove in the one of these cylinder 84 which is sandwiched between the other two may be inclined in a direction opposite from the groves in these other cylinders 82 and 86. Superconductive material, such as niobium tin, may be deposited in these grooves by a process similar to that discussed above in connection with FIGS. 2 and 3. The grooves may have a mortise form as in a dovetail to more effectively retain the deposited superconductive material. The cylinders 82, 84 and 86 may be held together by a force or shrink fit. The outer cylinder 86 may be of greater thickness than the inner cylinders 82 and 84. Helical coils 88, 90 and 92 of superconductive material are provided in each of the cylinders 82, 84 and 86, respectively, by the process described above. The beginnings and ends of adjacent ones of these coils 88, 90, and 92 may be interconnected by superconductive material wires 94 and 96. The wires may be secured to the edges of the turns by welds made after assembling the cylinders which welds provide superconducting contacts, or by deposited jumpers of superconductive material. The interconnected coils 88, 90 and 92 provide the multilayer solenoidal coil 80.

A ring-shaped member 98 of material similar to the cylinders 82, 84 and 86 and having an opening is provided. The opening in the ring 98 defines opposed ends 100 and 102, which are formed with shoulders 104 and 106, respectively. The ring member 98 is attached to the outer cylinder 86 by screws which extend through holes in the shoulders and engage threaded holes in the outer cylinder 86. Holes 108 and 110 are formed in the ends 100 and 102, respectively. A groove 112 may be formed around the inner periphery of the ring 98. Superconductive material, such as niobium tin, may be deposited in the walls of the holes 108 and 110 and in the groove 112 by a technique similar to that described for forming the conductive loop 22 (FIG. 2). One end of the multilayer coil 80 may be connected by a superconductive wire 114 to the superconductive material in the hole 108. The other end of the coil 80 may be connected by a superconductive wire 116 to the superconductive material in the hole 110. An endless superconducting path is then provided which extends through the multilayer coil 80 and around the loop of superconductive material in the groove 112.

The apparatus shown in FIGS. 7 and 8 may be located in a cryostat and persistent currents induced in the loop of superconductive material in the groove 112, as was explained above in connection with FIG. 1. A concentrated magnetic field is then established in the multilayer solenoidal coil 80 in response to the induced persistent current.

Referring to FIG. 9, there is shown a monolithic structure 120 including a ring 122 of nonsuperconductive material, such as stainless steel or a ceramic. A cylinder 124 of similar material is supported by a plurality of arms 126, 128, 130 and 134, which are integral with the ring 122 and the cylinder 124. This cylinder 124 has a center hole therethrough so that the cylinder 124 is tubular in shape. Three of the arms 126, 128 and 130 have openings 136 to provide clearance for a groove 138 around the inner surface of the ring 124. A helical groove 140 is formed in the inner surface of the cylinder 124. Holes 142 through the cylinder communicate with the first and last turn of this helical groove 140. Two grooves 144 respectively on opposite surfaces of the arm 134 communicate with the groove 138 in the inner periphery of the ring 122 and also respectively with the first and last turns of the helical groove 140 in the cylindrical 124. Superconductive material, such as niobium tin, may be deposited on the surfaces of the structure and then partially removed to provide a solenoidal coil 146 in the groove 140 and a superconductive loop 148 in the groove 138. This loop 148 and coil 146 are interconnected by the superconductive material in the grooves 144 and in the holes 142 to form an endless superconducting path when immersed in a cryogenic ambient.

The structure shown in FIG. 9 may be disposed in a cryostat. A magnetic field directed along the axis of the structure may be provided and varied to induce a persistent current along the endless superconductive path. This persistent current then establishes a concentrated magnetic field in the loop 148 and coil 146. The coaxial monolithic structure is physically strong and capable of resisting high density magnetic fields in the coil 146 due to very large persistent currents.

Figure 10:
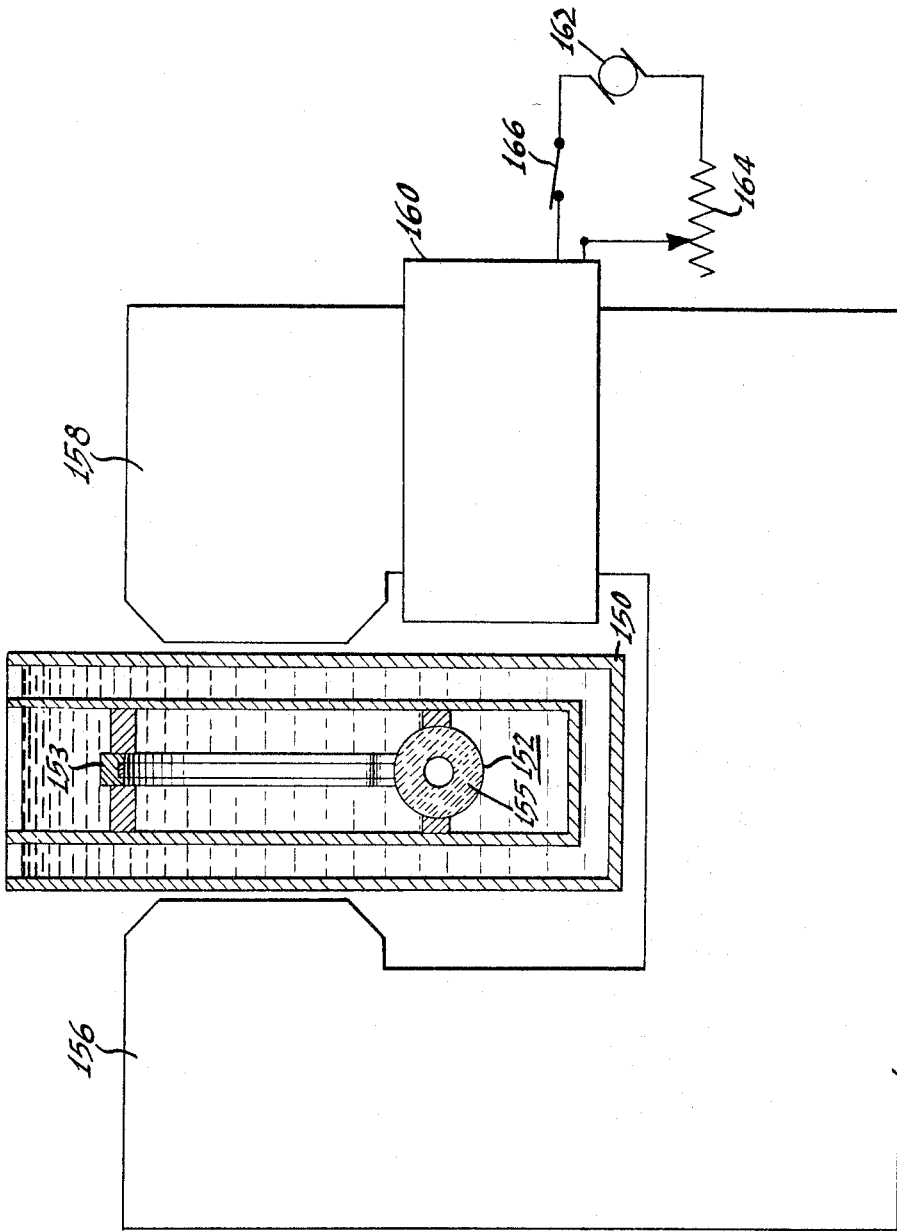
FIG. 10 is a schematic diagram of apparatus embodying the invention for setting up a persistent current in solenoid apparatus.

In FIG. 10, a cryostat 150 is shown in which solenoid apparatus 152, which may be of the type shown in any of FIGS. 2 to 9, is supported. A magnetic yoke structure 154 includes a pair of pole pieces 156 and 158 which are disposed on opposite sides of the opening in the loop 153 of the solenoid apparatus 152. While a portion of the cryostat 150 is shown disposed in the air gap defined by the pole pieces 156 and 158, it may be desirable to neck the cryostat inwardly around the loop 153 of the solenoid apparatus 152 so that the pole pieces 156 and 158 may be brought closer together. Then the field established between the pole pieces 156 and 158 which passes through the loop 153 would be more concentrated. A coil 160, wound around the yoke 154, is connected to a source of direct current 162, such as a battery or generator, through a rheostat 164. Other means, such as variable excitation of the generator, may be used to regulate or vary the current through the coil 160.

To induce a persistent current in the solenoid apparatus, the ordinary direct current through the coil 160 may be established before or during the time when liquid helium is being introduced into the cryostat. When the cryostat has become fully refrigerated (so that the superconductive material is superconducting), the persistent current may be established in the solenoid apparatus 152 by varying the current to the coil 160, for example, by cutting it off as by means of a switch 166, or even by reversing it, as by using a reversing switch or by reversing the generator. The scalar difference between the initial and final values of the current through the coil 160 may be chosen, in accordance with the laws of flux conservation and magnetic field generation already cited, so that the final field generated by the persistent current set up in the apparatus 152, has the desired magnitude. By subsequent variation of the current through the coil 160, the field set up in the apparatus 152 may subsequently be varied accordingly. If the desired terminal field is obtained when the final current through the coil 160 is zero, it may be possible to remove the entire yoke structure 154 from the cryostat and employ it elsewhere.

In FIG. 11, a closed core 170 of magnetic material is illustrated in the form of a loop. This core 170 may be made in parts 171 and 173. The part 171 is inserted through a tubular aperture 172, which is formed in the cryostat 150 and assembled with the other part 173 as by clamping means (not shown). This aperture 172 may be made by providing a double-walled tube 174 of smaller diameter than the cryostat which passes laterally through the cryostat 150. The space between the walls of the tube 174 is in communication with the space between the walls of the cryostat proper. Thus, liquid nitrogen can enter the region between the walls of the tube 174 to insulate the liquid helium in the cryostat from the space within by the inner periphery of the tube 174 through which the core part 171 passes. The solenoid apparatus 152, which is disposed in the cryostat 150, may be of the type wherein the ring 153 is detachable from the cylinder 155, so that the ring can be placed around the insulated tube 174 through which the core 170 extends. Preferably, the cryostat can be constructed in sections, as by glass blowing techniques, through and around a monolithic cylinder and ring. The core 170 and tube 174 desirably have diameters almost as large as the diameter of the opening in the loop 153, since more flux may then pass around the core 170 and induce larger persistent currents in the loop of the solenoid apparatus. Such currents may then generate larger magnetic fields in the solenoidal coil of the apparatus 152.

Like parts of both the apparatus shown in FIGS. 10 and 11 are designated with like reference numerals.

From the foregoing description, it will be apparent that there has been provided improved solenoid apparatus and an improved method of generating concentrated magnetic fields through the use of superconductors. While several embodiments of solenoid apparatus in accordance with the invention have been illustrated and examples of the method aspects of the invention have been discussed, variations in the illustrated apparatus and in the discussed methods will, undoubtedly, suggest themselves to those skilled in the art. Accordingly, the foregoing description should be taken only as illustrative and not in a limiting sense.

What is claimed is:
1. Superconductive solenoid apparatus comprising
   (a) a cylinder member and a ring-shaped member of much larger diameter than that of said cylinder member, both said members being of non-magnetic, non-superconductive material, said members being secured to each other, and

(b) means providing an endless path of superconductive material for carrying a persistent current, said path including a path portion around said ring-shaped member and a plurality of turns on said cylinder member and coaxial therewith, said turns defining a solenoidal coil.

2. Superconductive solenoid apparatus comprising
   (a) a body of nonsuperconductive material having a cylindrical hole, the wall of said body which defines said hole having a helical groove including a plurality of turns,
   (b) a ring member of the same material as and integral with said body, said ring member having a groove on the inner periphery thereof, said ring member diameter being much larger than that of said hole diameter, and
   (c) superconductive material in said helical groove, in said ring member groove and between the ends of said helical groove and the ends of said ring member groove, said superconductive material defining an endless superconductive path for carrying a persistent current, said superconductive material in said helical groove providing a solenoid.

3. Superconductive solenoid apparatus comprising
   (a) a cylinder of nonsuperconductive material,
   (b) an open ring of nonsuperconductive material, the ends of said ring being spaced from each other and attached to said cylinder,
   (c) said cylinder having a helical groove in the peripheral, cylindrical surface thereof,
   (d) said ring having a groove in the outer periphery thereof, and
   (e) superconductive material conductors in said helical groove and in said ring groove, the ends of said conductors being interconnected to define an endless superconductive path for supporting a persistent current.

4. Superconductive solenoid apparatus comprising
   (a) a monolithic structure including a cylinder and an open ring of nonsuperconductive material, said cylinder being disposed between the ends of said ring, the axis of said cylinder and the axis of said ring being in separate, perpendicular, intersecting planes,
   (b) said cylinder having an axial, cylindrical opening therethrough, said opening defining a cylindrical inner periphery of said cylinder,
   (c) said inner periphery and the outer periphery of said cylinder having helical grooves each including a plurality of turns, the first of each said plurality of turns starting adjacent one end of said cylinder and the last of each said plurality of turns terminating adjacent the opposite end of said cylinder, said helical grooves on said inner and outer peripheries being inclined in opposite directions with respect to each other,
   (d) said ring having a groove around its inner periphery, and
   (e) an endless layer of superconductive material disposed
      (1) in said ring groove,
      (2) in said inner periphery groove,
      (3) in said outer periphery groove,
      (4) between said first turns of said inner and outer periphery grooves,
      (5) between one end of said ring groove and said last turn of said inner periphery groove, and
      (6) between the other end of said ring groove and said last turn of said outer periphery groove, said endless layer being adapted to carry a persistent current.

5. Superconductive solenoid apparatus comprising
   (a) a plurality of hollow cylinders of nonsuperconductive material disposed coaxially in nested relationship,
   (b) each of said cylinders having a plurality of helical grooves on corresponding peripheries thereof, adjacent ones of said cylinders having their grooves inclined in opposite directions with respect to each other,
   (c) layers of superconductive material in each of said grooves, each of which layers defines a plural turn, solenoidal coil,
   (d) a ring of nonsuperconductive material having a groove around the one periphery thereof,
   (e) superconductive material in said ring groove which defines a superconductive loop, and
   (f) superconductive material connecting said coils and said loop in a continuous, closed circuit for carrying a persistent current.

6. Superconductive solenoid apparatus comprising
   (a) a monolithic structure including a hollow cylinder, a ring and a plurality of arms connecting said cylinder to said ring and maintaining said cylinder and said ring in coaxial relationship, and
   (b) means providing an endless path of superconductive material for carrying a persistent current, said path including a coil of a plurality of helical turns along the inner periphery of said cylinder, a loop along the inner periphery of said ring, and strips along one of said arms between opposite ends of said loop and opposite ends of said coil.

7. Electromagnetic apparatus comprising a monolithic structure of nonsuperconducting material having grooves along surfaces thereof, said grooves being filled with superconducting material, said material in said grooves comprising two coils, and superconducting means for connecting the two said coils in series,
   said two coils having different configurations, whereby a field produced by one of said coils is more concentrated than a field produced by the other of said coils.

8. The invention as expressed in claim 7 in which said grooves are dovetail-shaped in cross section.

References Cited by the Examiner
UNITED STATES PATENTS

| 3,150,291 | 9/1964 | Laquer | 317—123 |
| 3,193,734 | 7/1965 | Hempstead et al. | 317—158 |

MILTON O. HIRSHFIELD, *Primary Examiner.*

SAMUEL BERNSTEIN, *Examiner.*

D. YUSKO, J. SILVERMAN, *Assistant Examiners.*